United States Patent [19]

Severance, Jr. et al.

[11] Patent Number: 5,194,715
[45] Date of Patent: Mar. 16, 1993

[54] PLASMA ARC TORCH USED IN UNDERWATER CUTTING

[75] Inventors: Wayne S. Severance, Jr.; David G. Anderson, both of Florence, S.C.

[73] Assignee: ESAB Welding Products, Inc., Florence, S.C.

[21] Appl. No.: 799,369

[22] Filed: Nov. 27, 1991

[51] Int. Cl.$^5$ .............................................. B23K 9/00
[52] U.S. Cl. .................................. 219/121.48; 219/75; 219/121.5; 219/121.51; 219/121.59
[58] Field of Search ............ 219/121.48, 121.5, 121.51, 219/121.59, 75

[56] References Cited

U.S. PATENT DOCUMENTS

| | | |
|---|---|---|
| 2,806,124 | 9/1957 | Gage . |
| 2,906,858 | 9/1959 | Morton, Jr. . |
| 3,082,314 | 3/1963 | Arata et al. . |
| 3,204,076 | 8/1965 | Browning . |
| 3,534,388 | 10/1970 | Ito et al. . |
| 3,567,898 | 3/1971 | Fein . |
| 3,619,549 | 11/1971 | Hogan et al. . |
| 3,632,951 | 1/1971 | Klasson ............................ 219/75 |
| 3,641,308 | 2/1972 | Couch, Jr. et al. . |
| 3,649,805 | 3/1972 | Rohrberg . |
| 3,787,247 | 1/1974 | Couch, Jr. . |
| 3,833,783 | 9/1974 | Tanaka et al. . |
| 4,029,930 | 6/1977 | Sagara et al. . |
| 4,058,698 | 11/1977 | Bykhovsky et al. . |
| 4,203,022 | 5/1980 | Couch, Jr. et al. . |
| 4,291,217 | 9/1981 | Braun ............................... 219/121.5 |
| 4,311,897 | 1/1982 | Yerushalmy ..................... 219/121.5 |
| 4,382,170 | 5/1983 | Klingel ........................... 219/121.48 |
| 4,389,559 | 6/1983 | Rotolico et al. ................... 219/75 |
| 4,521,666 | 6/1985 | Severance, Jr. et al. ...... 219/121.59 |
| 4,816,637 | 3/1989 | Sanders et al. . |
| 4,954,688 | 9/1990 | Winterfeldt ..................... 219/121.5 |

FOREIGN PATENT DOCUMENTS

| | | |
|---|---|---|
| 1261927 | 9/1989 | Canada . |
| 86309 | 5/1896 | Fed. Rep. of Germany . |
| 2505665 | 8/1976 | Fed. Rep. of Germany . |
| 2842693 | 4/1980 | Fed. Rep. of Germany . |
| 1277179 | 4/1971 | United Kingdom . |
| 1326128 | 8/1973 | United Kingdom . |
| 1326624 | 8/1973 | United Kingdom . |
| 2057951 | 4/1981 | United Kingdom . |

Primary Examiner—Mark H. Paschall
Attorney, Agent, or Firm—Bell, Seltzer, Park & Gibson

[57] ABSTRACT

A plasma arc torch used in underwater cutting is disclosed. The plasma arc torch includes a torch body having a front end of substantially cylindrical configuration, and an electrode supported by the torch body and defining a discharge end extending toward the front end. A nozzle is mounted on the front end of the torch body adjacent the front discharge end of the electrode, and has a bore through which plasma is ejected. A cylindrical support body is secured onto the outer surface of the torch body and extends in spaced relation form the torch body outer surface toward the front end and forms an annular opening. A cylindrical sleeve has a rear portion received within the annular opening of the cylindrical support body and extends in spaced relation along the front end of the torch body to define an annular air chamber extending along the front end and forming an annular outlet opening positioned adjacent the nozzle. A high velocity gas is injected into the annular air chamber. The high velocity gas swirls downward through the outlet opening for generating a protective air curtain for the plasma during underwater torch operation.

36 Claims, 2 Drawing Sheets

PLASMA ARC TORCH USED IN UNDERWATER CUTTING

FIELD OF THE INVENTION

This invention relates to a plasma arc torch used in underwater cutting and a method of using such a torch.

BACKGROUND OF THE INVENTION

Plasma arc torches often are operated underwater to reduce the noise associated with plasma cutting and minimize the adverse environmental impact of the cutting process. The water traps the plasma generated emissions and particulates that otherwise would be discharged into the air. Additionally, underwater cutting reduces the amount of harmful glare and ultraviolet radiation exposed to workers.

However, underwater plasma arc cutting requires increased power requirements for torch operation at reduced rates of feed. Most importantly, the torches must be designed to protect the discharged plasma from water which tends to flow into the cutting zone. Not only is the cut quality reduced when water enters the cutting zone, but gaseous by-products such as hydrogen are generated, possibly resulting in small hydrogen detonations under the workpiece.

In one proposed plasma arc torch disclosed in U.S. Pat. No. 4,816,637, the torch includes an attachment which provides a flow of gas outward from the nozzle in enveloping relation to the plasma discharged from the nozzle. The gas is discharged downward through axial holes and through a substantially annular opening in inward circumferential relation to the plasma.

This flow forms a "gas bubble" or air curtain around the arc and minimizes the amount of water which can flow within the cutting zone. A flow of water having a velocity greater than 8.7 feet/second is then generated in spaced relation to the discharged gas to aid in controlling the shape of the flow of gas, and to aid in reducing the noise generated during cutting when the torch is used above water.

Although the water flow into the cutting zone is minimized with this proposed torch, the air curtain is not evenly formed throughout its circumference because the gas is discharged through individual gas discharge holes, producing multiple flows of gas. As a result, water may flow through the weaker areas of the bubble created by the lack of uniform gas flow within the annular air channel. Additionally, because the high velocity gas is discharged towards the plasma in multiple flows of gas, the gas impinges on the plasma without first expanding outward, creating a smaller, less desirable diameter air curtain, thus increasing the chance that water may flow into the cutting zone.

In U.S. Pat. No. 4,291,217, the plasma arc is enveloped by a compressed air sheath outside the nozzle. The compressed air flows through gas discharge openings evenly distributed around the nozzle and forms an uneven air curtain that provides some measure of protection against water entering the cutting zone. However, this proposed construction also may have some water passing into the cutting zone because the formed air curtain is uneven and additionally, smaller in diameter than desired.

SUMMARY OF THE INVENTION

It is therefore an object of the present invention to provide a plasma arc torch for underwater cutting in which a more even distribution of high velocity gas is discharged as an air curtain "bubble" around the discharged plasma.

It is another object of the present invention to provide a plasma arc torch for underwater cutting in which an evenly formed, protective air curtain is generated for protecting the plasma arc during underwater cutting.

It is another object of the present invention to provide a plasma arc torch for underwater cutting in which the high velocity gas that is discharged adjacent the nozzle not only forms a protective air curtain for the plasma, but also expands outward from the nozzle to form an air curtain of substantially greater diameter than heretofore achieved with other proposed underwater plasma arc torch constructions.

It is another object of the present invention to provide an attachment for a plasma arc torch which allows underwater cutting in which the plasma is protected with an even distribution of gas forming an air curtain "bubble" around the discharged plasma.

It is another object of the present invention to provide a method of underwater cutting with a plasma arc torch in which a high velocity gas is discharged in swirling relation downward along the front end of the torch body and through an outlet for generating a protective air curtain for the plasma during underwater cutting.

The plasma arc torch of the present invention allows a high velocity gas to be discharged into swirling relation along the front portion of the torch body and through an outlet opening adjacent the nozzle for generating an evenly formed protective air curtain "bubble" for the plasma during underwater torch operation.

In accordance with the present invention, the plasma arc torch includes a torch body having a front end of substantially cylindrical configuration and an electrode supported by the torch body and defining a longitudinal axis and a discharge end extending toward the front end. A nozzle is mounted on the front end of the torch body adjacent the front discharge end of the electrode and has a bore through which plasma is ejected.

Means for forming the air curtain is mounted on the outer surface of the torch body and extends in spaced relation along the front end of the torch body to define an annular air chamber extending along the front end and forming an annular outlet opening positioned adjacent the nozzle. A high velocity gas is injected into the annular air chamber in swirling relation downward along the front end of the torch body and through the outlet opening for generating an evenly formed protective air curtain for the plasma during underwater torch operation.

In a preferred embodiment, the air curtain means is a cylindrical sleeve mounted on the outer surface of the torch body. The sleeve extends in spaced relation along the front end of the torch body. A cylindrical support body is positioned above the cylindrical sleeve and is secured onto the torch body. The support body includes an annular opening that is dimensioned to receive the rear portion of the cylindrical sleeve. Means retains the cylindrical sleeve within the annular opening of the cylindrical support body. In one preferred embodiment, at least one O-ring is secured within the inner surface of the cylindrical support body for frictionally engaging the cylindrical sleeve.

The outer surface of the front end of the torch body is formed of a metallic material. An insulator is mounted between the metallic outer surface and the cylindrical support body for preventing double arcing during torch operation. An air channel orifice extends through the cylindrical support body and the cylindrical sleeve and terminates in the annular air chamber. An air fitting is mounted on the cylindrical support body and communicates with the air channel orifice extending through the cylindrical support body and the cylindrical sleeve.

An enlarged air plenum is defined between the cylindrical sleeve and the inner surface of the cylindrical support body. Air is first injected into the air plenum before passing into the annular air chamber. The annular air chamber also includes an enlarged air plenum into which air is injected before passing downward through the annular air channel. The outer surface of the torch body includes an annular groove forming the enlarged air plenum.

In the preferred embodiment, air is discharged through the annular air channel at a velocity of 950 to 4050 meters per minute during torch operation. The current density is between 28 and 45 amperes per square millimeter as calculated at the bore of the nozzle during torch operation.

DESCRIPTION OF THE DRAWINGS

Some of the objects and advantages of the present invention having been stated, others will appear as the description proceeds, when taken in conjunction with the accompanying drawings, in which.

DETAILED DESCRIPTION OF THE PREFERRED EMBODIMENT

Figure 1:
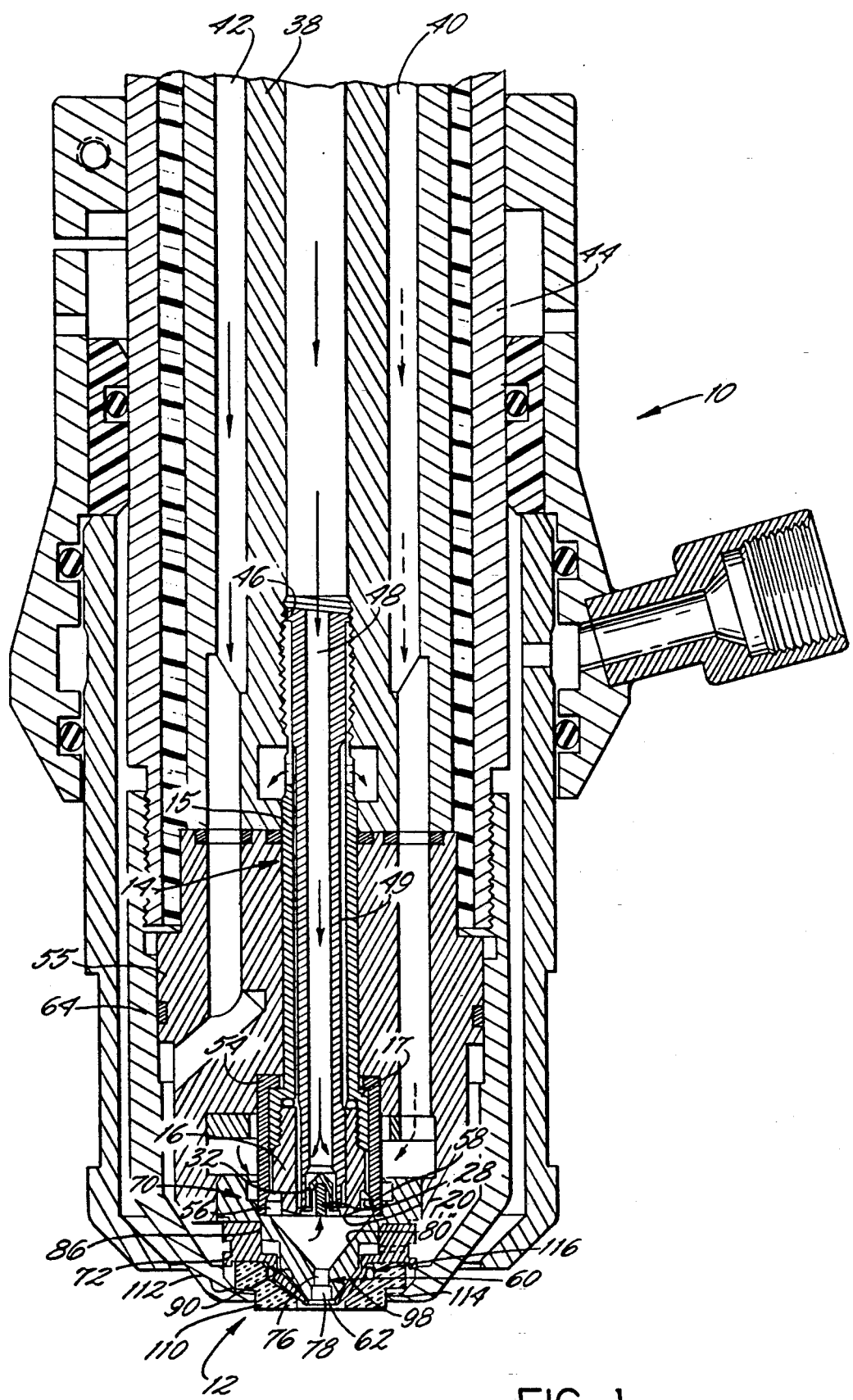
FIG. 1 is a sectioned, side elevation view of a plasma arc torch and air curtain attachment used in underwater cutting that embodies the features of the present invention.

Referring now to the drawings, and more particularly to FIG. 1, there is disclosed a plasma arc torch 10 in accordance with the present invention. The plasma arc torch 10 includes a nozzle assembly 12 and a tubular electrode 14 defining a longitudinal axis. The electrode 14 is preferably made of copper or a copper alloy, and it is composed of an upper tubular member 15 and a lower member Or holder 16. The member 15 also includes an internally threaded lower end portion 17. The holder 16 also is of tubular construction, and it includes a lower front end and an upper rear end. A transverse end wall closes the front end of the holder 16. The transverse end wall defines an outer front face 20. The rear end of the holder is externally threaded and is threadedly joined to the lower end portion 17 of the upper tubular member.

The holder 16 is open at the rear end so that the holder is cup shaped in configuration and defines an internal cavity. An insert 28 is mounted in the cavity and is disposed coaxially along the longitudinal axis. The emissive insert 28 is composed of a metallic material having a relatively low work function, preferably in the range of between about 2.7 to about 4.2 ev, to readily emit electrons upon an electric potential being applied thereto. Suitable examples of such materials are hafnium, zirconium, tungsten and alloys thereof. A relatively non-emissive sleeve 32 is positioned in the cavity 24 coaxially about the emissive insert 28. The sleeve 32 is composed of a metallic material having a work function which is greater than that of the material of the holder, and also greater than that of the material of the emissive insert. Further information concerning the electrode and insert are found in U.S. Pat. No. 5,023,425, issued Jun. 11, 1991, assigned to the present assignee, ESAB Welding Products, Inc. of Florence, S.C., which is hereby incorporated by reference.

In the illustrated embodiment, as shown in FIG. 1, the electrode 14 is mounted in a plasma arc torch body 38, which has gas and liquid passageways 40 and 42. The torch body 38 is surrounded by an outer insulated housing member 44. A tube 46 is suspended within the central bore 48 of the electrode 14 for circulating a liquid medium such as water through the electrode structure 14. The tube has a smaller diameter than the diameter of the bore 48 to provide a space 49 for the water to flow upon discharge from the tube 46. The water flows from a source (not shown), through the tube 46, back through the space 49 to an opening of the torch body, and to a drain hose (not shown). The passageway 42 directs the injection water into the nozzle assembly 12 where it is converted into a swirling vortex for surrounding the plasma arc as will be explained in more detail below.

The gas passageway 40 directs gas from a suitable source (not shown), through a conventional gas baffle 54 of any suitable high temperature ceramic material into a gas plenum chamber 56 via inlet holes 58. The inlet holes 58 are arranged to cause the gas to enter the plenum chamber 56 in a swirling fashion as is well-known. The gas flows out from the plenum chamber 56 through the arc constricting bore 60 and opening 62 of the nozzle assembly 12. When the electrode 14 is connected to the torch body 38, the electrode holds in place the ceramic gas baffle 54 and a high temperature plastic insulating member 55. The member 55 electrically insulates the nozzle assembly 12 from the electrode 14. An outer Cup shield 64 is threadedly mounted on the torch body and engages the nozzle assembly 12 to retain the nozzle assembly 12 in position and protect component parts of the nozzle assembly. The outer cup shield 64 is formed of a metallic material such as copper.

The nozzle assembly 12 includes a nozzle base 70 and a lower nozzle member 72. The nozzle base 70 is formed from copper or a copper alloy, and includes a substantially cylindrical body portion. The arc constricting bore 60 extends through the lower end of the nozzle base 70 and is aligned with the longitudinal axis defined by the electrode. The bore 60 includes a first bore section 76 positioned toward the electrode and a second bore section 78 defining the exit end of the bore and having a diameter greater than the diameter of the first bore section. The two bores 76, 78 provide for a more controlled, plasma discharge flow.

The nozzle base 70 includes an interior, chamfered, frusto-conical surface 80 tapering inward toward the bore 60 in a direction away from the electrode. This surface 80 also constricts the arc during torch operation. The nozzle base 70 includes an annular mounting shoulder 86, and an outer, frustoconical surface 90 tapering downward toward the longitudinal axis in a direction away from the electrode.

Figure 2:
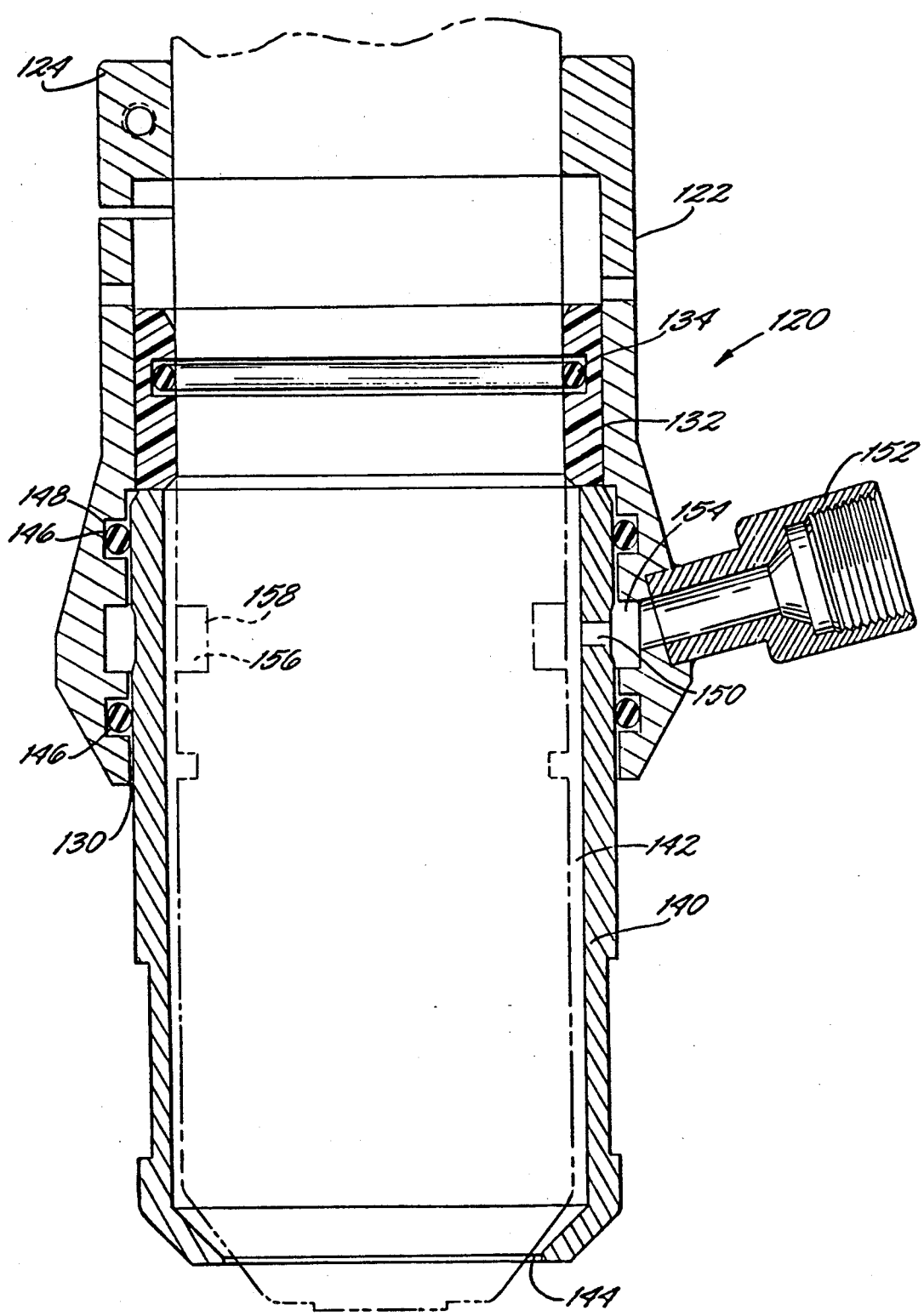
FIG. 2 is a partially sectioned, side elevation view of various components forming the air curtain attachment which mounts onto a plasma arc torch.

The lower nozzle member 72 comprises a cylindrical body portion formed of a metallic material, preferably a free cutting brass. The upper portion of the lower nozzle member includes an annular collar portion dimensioned for an interference fit with the mounting shoulder 86 positioned on the nozzle base 70. The lower nozzle member includes a plasma discharge opening 62 aligned with the longitudinal axis and positioned adjacent the bore (FIG. 2). A tapered, interior surface is spaced from the outer frustoconical surface 90 of the nozzle base to form a downwardly angled water passage 98 through which water is injected from the water passageway 42 into impinging contact with the plasma.

A ceramic insulator 110 is secured onto the lower nozzle member and extends substantially along the outer surface of the lower nozzle member. The ceramic insulator prevents double arcing and insulates the lower nozzle member from heat and plasma generated during torch operation. The ceramic insulator 110 is held in place by O-ring 116, which engages a shoulder on the ceramic insulator and the lower nozzle member.

The outer cup shield 64 has a lip 112 at its forward end (FIG. 1). The lip 112 engages a shoulder 114 on the ceramic insulator 110 and retains the ceramic insulator, lower nozzle member 72 and nozzle base 72 in position against the ceramic insulator 110.

A power source (not shown) is connected to the torch electrode 14 in a series-circuit relationship with a metal workpiece, which typically is grounded. In operation, the plasma arc is established at the emissive insert of the torch 10 and acts as the cathode terminal for the arc. The work piece is connected to the anode of the power supply and positioned below the lower nozzle member. The plasma arc is started in conventional manner by momentarily establishing a pilot arc between the electrode 14 and the nozzle assembly 12. The arc then is transferred to the work piece and is ejected through the nozzle bores 76, 78. The arc is intensified, and the swirling vortex of water envelopes the plasma as it passes through the opening.

Referring now to FIGS. 1 and 2, there is illustrated the air curtain attachment, indicated generally at 120, which allows an evenly formed protective air curtain to be generated for protecting the plasma from water flow into the plasma during underwater cutting. Although the attachment 120 will be described as an addition to the torch, the attachment also could be manufactured integral with the torch during the torch's manufacture.

The attachment 120 includes a cylindrical support body 122 formed preferably from a chromium plated brass. The cylindrical support body 122 includes a split upper portion 124, which forms a clamping collar. A socket head cap screw (not shown) joins both sides of the clamp together to secure the cylindrical body to the outer surface of the torch, and more particularly the insulated housing member 44. The cylindrical support body 122 extends in spaced relation from the torch body outer surface towards the front end defined by the outer cup shield 64, and forms an annular opening 130 at the front end.

An insulating sleeve 132 is positioned between the cylindrical support body 122 and the metallic outer surface for insulating the cylindrical support body 122 from the outer surface of the torch body. In the preferred embodiment, the insulating sleeve is secured to the inside surface of the cylindrical support body. An O-ring 134 is secured within an internal groove of the insulating member and helps secure the insulating sleeve 132 onto the outer surface of the torch. The insulating sleeve 132 preferably is formed of a low grade phenolic and the cylindrical support body and the insulating sleeve may be slid onto the outside surface of the torch and positioned as shown in FIGS. 1 and 2.

A cylindrical sleeve 140 is received into the annular opening 130 of the cylindrical support body 122. The cylindrical sleeve 140 is preferably formed of anodized aluminum to form a light-weight, but strong structure that is resistant to corrosion. The sleeve 140 extends in spaced relation along the front end of the torch body to define an annular air chamber 142 extending along the front end and forming an annular outlet opening 144 positioned adjacent the nozzle. The rear portion of the cylindrical sleeve 140 is received in the annular opening 130. A pair of O-rings 146 are secured within annular grooves 148, and help retain the cylindrical sleeve to the cylindrical support body 122. The outlet opening defined by the cylindrical sleeve is preferably about 1/32 inch to about 1/16 inch.

As illustrated in FIGS. 1 and 2, the lower portion of the cylindrical support body is diametrically enlarged to allow enough area for the formed grooves 148 in which the O-rings 146 are positioned. At least one air channel orifice 150 also extends from the diametrally enlarged portion through the cylindrical support body 122 and the cylindrical sleeve 140. The air channel orifice 150 terminates at the annular air chamber 142 and allows a high velocity gas to be injected into the annular air chamber in swirling relation downward along the front end of the torch body and through the outlet opening 144 for generating an evenly formed protective air curtain. An air fitting 152 is mounted on the diametrically enlarged portion of the cylindrical support body 122 and communicates with the air channel orifice 150. Standard hoses (not shown) screw into the air fitting 152 and provide a source of high velocity gas. An enlarged air plenum 154 is defined between the cylindrical sleeve 140 and the inner surface of the cylindrical support body 122. Thus, high velocity gas is first injected into the air plenum before passing into the annular air chamber 142.

The annular air chamber 142 also includes an enlarged air plenum 156 into which air is injected before passing downward through the annular air channel 142. The outer surface of the torch body has an annular groove 158, forming the enlarged air plenum. During torch operation, the high velocity gas is discharged into the air channel orifice 150 and into the first plenum chamber 154. In a preferred embodiment, the gas is distributed in the plenum chamber and then moves through a plurality of evenly spaced orifices 150 that extend tangentially into the second plenum chamber 156. The tangentially inclined orifices provide a swirling gas flow within the plenum chamber 156. The high velocity gas swirls downward through the annular air channel 142 and is discharged through the outlet 144 to form a protective air curtain for the plasma.

Preferably the air is discharged through the annular air channel at a velocity of 950 to 4,050 meters a minute. While operating under water, the current density is between 28 and 45 amperes per square millimeters as calculated at the bore of the nozzle. The swirling high velocity gas forms an evenly distributed air curtain which prevents water from flowing into the cutting zone. Additionally, the swirling high velocity gas expands outward after exiting the outlet 144 and forms a larger diameter air curtain than accomplished with other proposed constructions. Thus, the water is less prone to flow into the cutting zone than with other proposed torch constructions noted in the general background.

In the drawings and specifications, there has been set forth a preferred embodiment of the invention, and although specific terms are employed, they are used in a generic and descriptive sense only and not for purposes of limitation.

That which is claimed is:

1. A plasma arc torch used in underwater cutting comprising
   a torch body having a front end of substantially cylindrical configuration,
   an electrode supported by the torch body and defining a longitudinal axis and a discharge end extending toward the front end,
   a nozzle mounted on the front end of the torch body adjacent the front discharge end of the electrode, and having a bore through which plasma is ejected,
   means mounted on the outer surface of the torch body and extending in spaced relation along the front end of the torch body to define an annular air chamber extending along the front end and forming an annular outlet opening positioned adjacent the nozzle and radially spaced outwardly from said bore, and
   means for injecting a high velocity gas into the annular air chamber in swirling relation downward along the front end of the torch body, through the outlet opening for generating an evenly formed and swirling protective air curtain for the plasma during underwater torch operation.

2. The plasma arc torch according to claim 1 wherein said means mounted on the outer surface of the torch body and extending in spaced relation along the front end of the torch body includes a cylindrical sleeve.

3. The plasma arc torch according to claim 2 including a cylindrical support body positioned above the cylindrical sleeve and secured onto the torch body, said cylindrical support body including a front portion forming an annular opening that is dimensioned to receive the rear portion of the cylindrical sleeve, and including means for retaining the cylindrical sleeve within annular opening of the cylindrical support body.

4. The plasma arc torch according to claim 3 wherein said means for retaining the cylindrical sleeve within the annular opening of the cylindrical support body includes at least one O-ring secured within the inner surface of the cylindrical support body for frictionally engaging the cylindrical sleeve.

5. The plasma arc torch according to claim 3 wherein the outer surface of the front end of the torch body is metallic and includes an insulator mounted between the outer surface of the torch body and the cylindrical support body for preventing double arcing during torch operation.

6. The plasma arc torch according to claim 3 wherein said means for injecting air into the annular air channel includes at least one air channel orifice extending through the cylindrical sleeve and terminating in the annular air chamber.

7. The plasma arc torch according to claim 6 including an air fitting mounted on the cylindrical support body, and wherein said air channel orifice extends through said cylindrical support body and communicates with the air fitting.

8. The plasma arc torch according to claim 3 including an enlarged air plenum defined between the cylindrical sleeve and the inner surface of the cylindrical support body and into which the air is first injected before passing into the annular air chamber.

9. The plasma arc torch according to claim 1 wherein the annular air chamber includes an enlarged air plenum into which air is injected before passing downward through the annular air channel.

10. The plasma arc torch according to claim 9 wherein the outer surface of the torch body includes an annular groove forming the enlarged air plenum.

11. The plasma arc torch according to claim 1 wherein air is discharged through the annular air channel at a velocity of 950 to 4050 meters/minute during torch operation.

12. The plasma arc torch according to claim 1 wherein the current density is between 28 and 45 amperes per square millimeter as calculated at the bore of the nozzle during torch operation.

13. A plasma arc torch used in underwater cutting comprising
   a torch body having a front end of substantially cylindrical configuration,
   an electrode supported by the torch body and defining a longitudinal axis and a discharge end extending toward the front end,
   a nozzle mounted on the front end of the torch body adjacent the front discharge end of the electrode, and having a bore through which plasma is ejected,
   a cylindrical support body secured onto the outer surface of said torch body and extending in spaced relation of the torch body outer surface toward the front end and forming an annular opening,
   an insulating sleeve positioned between the cylindrical support body and the torch body outer surface for insulating the cylindrical support body from the outer surface,
   a cylindrical sleeve having a front and rear portions, and wherein the rear portion is received within the annular opening of the cylindrical support body, said cylindrical sleeve extending in spaced relation along the front end of the torch body to define an annular air chamber extending along the front end and forming an annular outlet opening positioned adjacent the nozzle and radially spaced outwardly from said bore,
   air channel means extending through the cylindrical sleeve and terminating at the annular air chamber for allowing a high velocity gas to be injected into the annular air chamber in swirling relation downward along the front end of the torch body, through the outlet opening, for generating an evenly formed and swirling protective air curtain for the plasma during torch operation underwater.

14. The plasma arc torch according to claim 13 wherein said means for retaining the cylindrical sleeve within the annular opening of the cylindrical support body includes at least one O-ring secured within the inner surface of cylindrical support body for frictionally engaging the cylindrical sleeve.

15. The plasma arc torch according to claim 13 including an air fitting mounted on the cylindrical support body and wherein said air channel means extends through said cylindrical support body and communicates with the air channel means.

16. The plasma arc torch according to claim 13 including an enlarged air plenum defined between the cylindrical sleeve and the inner surface of the cylindrical support body and into which the high velocity gas is first injected before passing into the annular air chamber.

17. The plasma arc torch according to claim 13 wherein the annular air chamber includes an enlarged air plenum into which air is injected before passing downward through the annular air channel.

18. The plasma arc torch according to claim 17 wherein the outer surface of the torch body includes an annular groove forming the enlarged air plenum.

19. The plasma arc torch according to claim 13 wherein air is discharged through the annular air channel at a velocity of 950 to 4050 meters/minute.

20. The plasma arc torch according to claim 13 wherein the current density is between 28 and 45 amperes per square millimeter as calculated at the bore of the nozzle.

21. A plasma arc torch used in underwater cutting comprising a torch body having a front end of substantially cylindrical configuration, an electrode including an elongate, metallic tubular holder supported by the torch body and defining a longitudinal axis and front discharge end, the holder having a front face and a cavity formed in the front face along the longitudinal axis, and means mounted in the cavity for emitting electrons upon an electric potential being applied thereto, a nozzle mounted on the front end of the torch body adjacent the front discharge end of the electrode, said nozzle comprising a) a nozzle base mounted adjacent the discharge end of the electrode and having an outer frusto-conical surface tapering toward the longitudinal axis in a direction away from the electrode and a bore through which plasma is ejected, and b) a lower nozzle member mounted adjacent the nozzle base on the side opposite side the electrode and having a lower discharge opening aligned with the longitudinal axis and positioned adjacent the bore, and including an interior surface spaced from the outer frusto-conical surface of the nozzle base to form a water passage, means for creating an electrical arc extending from the electrode and through the bore and discharge opening to a workpiece located adjacent the lower nozzle member, means for introducing a jet of liquid into the water passage and outward therefrom so as to envelope the plasma as it passes through the bore and discharge opening, means mounted on the outer surface of the torch body and extending in spaced relation along the front end of the torch body to define an annular air chamber extending along the front end and forming an annular outlet opening positioned adjacent the nozzle and radially spaced outwardly from said bore, and means for injecting a high velocity gas into the annular air chamber in swirling relation downward along the front end of the torch body, through the outlet opening for generating an evenly formed and swirling protective air curtain for the plasma during underwater torch operation.

22. The plasma arc torch according to claim 21 wherein said means mounted on the outer surface of the torch body and extending in spaced relation along the front end of the torch body includes a cylindrical sleeve.

23. The plasma arc torch according to claim 22 including a cylindrical support body positioned above the cylindrical sleeve and secured onto the torch body, said cylindrical support body including a lower portion forming an annular opening that is dimensioned to receive the top portion of the cylindrical sleeve, and including means for retaining the cylindrical sleeve within annular opening of the cylindrical support body.

24. The plasma arc torch according to claim 23 wherein said means for retaining the cylindrical sleeve within the annular opening of the cylindrical support body includes at least one O-ring secured within the inner surface of cylindrical support body for frictionally engaging the cylindrical sleeve.

25. The plasma arc torch according to claim 23 wherein the outer surface of the front end of the torch body is formed of metallic material, and including an insulator mounted between the metallic surface of the torch body and the cylindrical support body for preventing double arcing during torch operation.

26. The plasma arc torch according to claim 23 wherein said means for injecting air into the annular air chamber includes at least one air channel orifice extending through the cylindrical sleeve to terminate in the annular air chamber.

27. The plasma arc torch according to claim 23 including an enlarged air plenum defined between the cylindrical sleeve and the inner surface of the cylindrical support body and into which the air is first injected before passing into the annular air chamber.

28. The plasma arc torch according to claim 23 including an air fitting mounted on the cylindrical body member and wherein the air channel orifice extends through the cylindrical support member and communicates with the air channel orifice.

29. The plasma arc torch according to claim 21 wherein the annular air chamber includes an enlarged air plenum into which air is injected.

30. The plasma arc torch according to claim 29 wherein the outer surface of the torch body includes an annular groove forming the enlarged air plenum.

31. The plasma arc torch according to claim 21 wherein air is discharged through the annular air channel at a velocity of 950 to 4050 meters/minute during torch operation.

32. The plasma arc torch according to claim 21 wherein the current density is between 28 and 45 amps per square millimeter as calculated at the bore of the nozzle during torch operation.

33. An attachment for mounting onto the front portion of a plasma arc torch to allow underwater cutting comprising a cylindrical support body adapted to be secured onto the outer surface of a torch body so that the support body extends in spaced relation of the torch body outer surface toward the front end to form an annular opening, an insulating sleeve adapted to be positioned between the cylindrical support body and the torch body outer surface for insulating the cylindrical support body from the torch body outer surface, a cylindrical sleeve having a front and rear portions, and wherein the rear portion is adapted to be received within the annular opening of the cylindrical support body so that the cylindrical sleeve extends in spaced relation along the front end of the torch body to define an annular air chamber extending along the front end and forming an annular outlet opening positioned adjacent the nozzle and radially spaced outwardly from said bore, and air channel means extending through the cylindrical support body and the cylindrical sleeve and terminating on the inner surface of the cylindrical sleeve for allowing a high velocity gas to be injected into the annular air chamber in swirling relation downward along the outer surface of the torch body, through the outlet opening, for generating an evenly formed and swirling protective air curtain for the discharged plasma during underwater cutting.

34. A method of underwater cutting with a plasma arc torch having a torch body with a front end of substantially cylindrical configuration, an electrode supported by the torch body and defining a longitudinal axis and a discharge end extending toward the front end, a nozzle mounted on the front end of the torch body adjacent the front discharge end of the electrode, and having a bore through which plasma is ejected, and means mounted on the outer surface of the torch body and extending in spaced relation along the front end of the torch body to define an annular air chamber extending along the front end and forming an annular outlet opening positioned adjacent the nozzle and radially spaced outwardly from said bore, the method comprising the step of injecting a high velocity gas into the annular air chamber in swirling relation downward along the front end of the torch body and through the outlet opening for generating a swirling protective air curtain for the plasma during underwater operation.

35. The method according to claim 34 wherein gas is discharged through the annular air channel at a velocity of 950 to 4050 meters/minute during torch operation.

36. The method according to claim 34 wherein the current density is between 28 and 45 amperes per square millimeter as calculated at the bore of the nozzle during torch operation.

* * * * *